Patented July 5, 1938

2,122,828

UNITED STATES PATENT OFFICE 2,122,828

LIGHT FILTER

Christian Wiegand and Erich Merkel, Wuppertal-Elberfeld, and Ernst Tietze, Cologne, Germany, assignors to Winthrop Chemical Company, Inc., New York, N. Y., a corporation of New York No Drawing. Application December 8, 1936, Serial No. 114,878. In Germany April 4, 1935

6 Claims. (Cl. 95—81)

This invention relates to light filters which are suitable for protecting any objects against noxious light rays.

It is the object of light filters to screen off wholly or partially the light of certain wave lengths. In the application of light filters it is often necessary or desirable that the absorption begins at a certain wave length suddenly, i. e. that a precise absorption boundary is provided at the respective wave length. For instance, the absorption of such light filters as are intended to screen off the ultraviolet range and to allow to pass as far as possible the visible range of the spectrum must have a sudden beginning at a wave length of about 400 m$\mu$ and must attain such a high value that the protection is still sufficient even if low concentrations and only thin layers of the absorbing medium are applied, i. e. any displacement of the absorption boundary by altering the concentration or the thickness of the layer is excluded.

According to the present invention it has been established that practically colorless pyrene compounds the absorption curve of which has a sudden beginning at a wavelength of about 400 m$\mu$ and which attains such a high value that practically no displacement of the absorption boundary occurs by altering the concentration or the layer thickness can be used as the absorbing agent of such light filters. Such practically colorless pyrene compounds—whereby the term "practically colorless" whenever used in the disclosure or in the appended claims is to comprise the completely colorless as well as the almost colorless for instance the slightly yellowish compounds—display a high and simultaneously steep slope of their absorption curve, e. g. an increase of the logarithm of the molar extinction coefficient ($\epsilon$) of at least 1 within about 10 m$\mu$, particularly in the region of about 390 to about 405 m$\mu$. The logarithm of the molar extinction coefficient reaches thereby the value of at least 3.2.

By the use of these pyrene compounds a sudden and selective absorption of the ultraviolet rays at the limit of the visible range of the spectrum is effected.

Suitable pyrene compounds are for instance 3,5,8,10-pyrenetetrasulfonic acid sodium,
3-chloropyrene-5,8,10-trisulfonic acid sodium
3,5-dimethoxypyrene,
3,5,8,10-tetramethoxypyrene,
3-benzoylamidopyrene-para-disulfonic acid sodium,
the urea of 4'-aminobenzoyl-3-aminopyrenedisulfonic acid sodium and
pyrene-3-carboxylic acid methyl ester.

Instead of the aforesaid sodium salts other salts, such as the potassium, ammonium, magnesium or calcium salts may be used.

The said compounds can be used alone. Preferably they are mixed with a solvent or a carrier. The nature of the solvent or the carrier depends on the special purpose for which the light filter according to the present invention is to be used. Suitable solvent or carriers are for instance water, organic solvents such as alcohol, benzene, dioxane, acetone, glycerol, glycol, high molecular alcohols, high molecular aliphatic hydrocarbons such as vaseline and other paraffines, fats, waxes and oils such as nut oils, pine oils and olive oil and other bases of ointments, skin creams and lotions for instance eucerine, lanolinum anhydricum, wool fat, lard, hydrogenated arachis oil and the like. Also gelatin and cellulose derivatives such, for instance, as paper, parchment paper, methyl, ethyl and benzyl cellulose may be used as carriers. Especially transparent cellulose materials such as regenerated cellulose which is commercially known under the trade mark "Cellophane" are suitable for this purpose.

In order to secure a continuous absorption of the whole ultraviolet region of the spectrum it is sometimes necessary or desirable to add other ultraviolet absorbents for instance the nitrile of $\alpha$-phenylcinnamic acid, 2-phenylbenzimidazole sulfonic acid sodium, 2-(p-tolyl)-benzimidazole, 2-(p-methoxyphenyl)-benzimidazole, 2-(p-dimethylaminophenyl)-benzimidazole, or 2-thiobenzimidazole. The addition of compounds of the benzimidazole series has been found to be very advantageous.

The light filters thus prepared may serve, for instance, as sunburn preventatives especially in the glacier region where also a strong absorption of the longer wavelengths of the ultraviolet part of the spectrum is necessary. As such sunburn preventative we prefer generally a mixture of an ointment base with pyrene-3.5.8.10-tetrasulfonic acid sodium, $\alpha$-phenyl-$\beta$-(p-methoxyphenyl)-acrylic nitrile and 2-phenylbenzimidazole sulfonic acid sodium. Other light filters which contain, for instance a colorless pyrene compound incorporated into parchment paper or regenerated cellulose may serve as packaging material or in the case when transparent materials are used for coating window glasses. For photographic purposes gelatin layers containing a practically colorless pyrene compound of the type claimed have proved suitable. For the three last named purposes it is advantageous to use pyrene derivatives which go directly on the animal or vegetable fibre, for instance acylaminopyrenes which have been substituted by acid groups such as 3-benzoylaminopyrene disulfonic acid and its salts and the urea derivative of 4-aminobenzoyl-3-aminopyrene disulfonic acid salts. Other preparations containing the said pyrene derivatives, for instance, solutions in water or the usual organic solvents, may serve as filters for physical purposes where a sudden absorption beginning at the longer wavelengths of the ultraviolet part of the spectrum is desired.

Since pyrene sulfonic acids can easily be prepared and since they are further distinguished in that many of their salts are readily soluble in water, we generally prefer these compounds and among them particularly pyrene-3.5.8.10-tetra-sulfonic acid for the purpose of the present invention.

The following examples illustrate the invention, the parts being by weight:—

Example 1

During the further working of normally prepared paper material, 1% of the sodium salt of 3-benzoylaminopyrene disulphonic acid is added to the mass, which is then converted into parchment paper in the usual manner by a treatment of 15–20 seconds with sulfuric acid of 60° Bé.

Example 2

1 part of 3,5-dimethoxypyrene is dissolved in 99 parts of nitrocellulose lacquer. By evaporation of the solvent in the usual manner, a colorless water insoluble film is obtained which protects against ultraviolet rays. The nitrocellulose may also be replaced by other lacquers. Instead of 3,5-dimethoxypyrene also pyrene-3-carboxylic acid methyl ester or the corresponding butyl ester may be employed.

Example 3

2 parts of the sodium salt of pyrene-3,5,8,10-tetrasulfonic acid are dissolved in 9 parts of water. The solution obtained is mixed with a solution of 1 part of phenylbenzimidazole sulfonic acid sodium in 2 parts of water. 10 parts of anhydrous lanolin containing camomile extract, 15 parts of anhydrous lanolin and 60 parts of wool fat are molten and 1 part of $\alpha$-phenyl-$\beta$-(p-methoxyphenyl)-acrylic nitrile is added thereto. The aqueous salt solution is then mixed with the still liquid fatty mixture. If desired, cosmetic auxiliary products are added. By covering the skin with the ointment thus obtained an excellent protection is achieved against strong sun ray irradiation.

Example 4

A foil of cellulose hydrate is passed through a bath containing 1% of the urea derivative of 4'-aminobenzoyl-3'-aminopyrene disulfonic acid sodium at 50° C. in such a manner that every part of the foil is covered by the liquid for one minute. After the usual aftertreatment a substantive impregnation of the foil is obtained which gives a good protection against ultraviolet rays.

This application is a continuation in part application of our application Ser. No. 71,052, filed March 26, 1936.

We claim:—

1. Light filters comprising as the active ingredient a practically colorless pyrene compound the absorption curve of which displays at about 400 m$\mu$ such a high and simultaneously steep slope that the logarithm of the molar extinction coefficient ($\epsilon$) increases of at least 1 within 10 m$\mu$ and reaches at least the value 3.2.

2. Light filters comprising as the active ingredient a practically colorless pyrene compound the absorption curve of which displays at about 390 to 405 m$\mu$ such a high and simultaneously steep slope that the logarithm of the molar extinction coefficient ($\epsilon$) increases of at least 1 within 10 m$\mu$ and reaches at least the value 3.2.

3. Light filters comprising as the active ingredient a practically colorless pyrene sulfonic acid the absorption curve of which displays at about 400 m$\mu$ such a high and simultaneously steep slope that the logarithm of the molar extinction coefficient ($\epsilon$) increases of at least 1 within 10 m$\mu$ and reaches at least the value 3.2.

4. Light filters comprising as the active ingredient pyrene-3,5,8,10-tetrasulfonic acid.

5. Light filters comprising as the active ingredient the urea of a 4'-aminobenzoyl-3-aminopyrenedisulfonic acid salt.

6. Light filters comprising as the active ingredient the urea of a 4'-aminobenzoyl-3-aminopyrenedisulfonic acid sodium.

CHRISTIAN WIEGAND.
ERICH MERKEL.
ERNST TIETZE.